United States Patent
Eul

(10) Patent No.: US 8,870,130 B2
(45) Date of Patent: Oct. 28, 2014

(54) DEVICE FOR GUIDING LINES, HOSES, OR THE LIKE

(75) Inventor: Werner Eul, Troisdorf (DE)

(73) Assignee: Tsubaki Kabelschlepp GmbH, Wenden (DE)

( * ) Notice: Subject to any disclaimer, the term of this patent is extended or adjusted under 35 U.S.C. 154(b) by 399 days.

(21) Appl. No.: 12/733,373

(22) PCT Filed: Aug. 25, 2008

(86) PCT No.: PCT/EP2008/061064
§ 371 (c)(1),
(2), (4) Date: Jul. 6, 2010

(87) PCT Pub. No.: WO2009/030602
PCT Pub. Date: Mar. 12, 2009

(65) Prior Publication Data
US 2010/0301176 A1    Dec. 2, 2010

(30) Foreign Application Priority Data
Sep. 3, 2007    (DE) .......................... 10 2007 041 663

(51) Int. Cl.
| | |
|---|---|
| F16L 3/00 | (2006.01) |
| F16L 3/01 | (2006.01) |
| H02G 3/04 | (2006.01) |
| F16L 3/26 | (2006.01) |
| H02G 11/00 | (2006.01) |

(52) U.S. Cl.
CPC ..... *H02G 3/045* (2013.01); *F16L 3/01* (2013.01); *F16L 3/26* (2013.01); *H02G 11/00* (2013.01)
USPC ............................. 248/49; 248/68.1; 174/101

(58) Field of Classification Search
CPC ..... H05K 7/1491; H04Q 1/062; H04Q 1/064; H02G 3/0456; H02G 3/045; H02G 3/26; H02G 3/263; F16L 3/22; F16L 3/26
USPC ............ 248/49, 58, 68.1; 174/68.1, 72 R, 95, 174/101
See application file for complete search history.

(56) References Cited

U.S. PATENT DOCUMENTS

| | | | | |
|---|---|---|---|---|
| 3,363,048 A | * | 1/1968 | Vaughn | ....................... 174/72 A |
| 3,363,050 A | * | 1/1968 | Martin | ........................... 174/101 |

(Continued)

FOREIGN PATENT DOCUMENTS

| | | |
|---|---|---|
| DE | 265 449 A1 | 3/1989 |
| EP | 0 544 027 A1 | 6/1993 |

(Continued)

OTHER PUBLICATIONS

English language Translated Description and Claims of WO 98/40645, European Patent Office's esp@cenet.com database, 7pp, Apr. 30, 2010.

(Continued)

*Primary Examiner* — Gwendolyn W Baxter
(74) *Attorney, Agent, or Firm* — Smith Law Office

(57) ABSTRACT

The invention relates to a line guidance device for guiding cables, lines, hoses, and the like between one locally fixed and one movable connection point, wherein the line guiding device has at least one support unit having a substantially band-shaped design, and retaining elements designed in one piece with the support unit, wherein the retaining elements are formed from the support unit and protrude from the same in a substantially transverse fashion toward the support unit.

6 Claims, 8 Drawing Sheets

(56) References Cited

U.S. PATENT DOCUMENTS

| | | | | |
|---|---|---|---|---|
| 3,430,662 A * | 3/1969 | Guarnaschelli | ............... | 138/120 |
| 3,473,769 A | 10/1969 | James | | |
| 3,890,459 A * | 6/1975 | Caveney | ....................... | 174/101 |
| 4,484,020 A | 11/1984 | Lööf | | |
| 5,806,811 A * | 9/1998 | Viklund et al. | ................. | 248/49 |
| 6,708,480 B1 * | 3/2004 | Wehler | ........................... | 59/78.1 |
| 7,019,213 B1 * | 3/2006 | McNutt et al. | ............... | 174/68.1 |
| 7,278,253 B2 * | 10/2007 | Wehler et al. | .................. | 59/78.1 |
| 7,348,488 B2 * | 3/2008 | Benito-Navazo | ........... | 174/72 A |
| 7,515,806 B2 * | 4/2009 | Zellak et al. | .................. | 385/137 |
| 7,963,486 B2 * | 6/2011 | Wilson et al. | ................... | 248/49 |

FOREIGN PATENT DOCUMENTS

| | | |
|---|---|---|
| JP | 59-14308 | 1/1984 |
| JP | 60-151184 | 10/1985 |
| JP | 4-101217 | 9/1992 |
| JP | 5-161232 | 6/1993 |
| JP | 10-221533 | 8/1998 |
| JP | 11-196519 | 7/1999 |
| JP | 2000-227145 | 8/2000 |
| JP | 2005-124318 | 5/2005 |
| WO | WO 97/44606 | 11/1997 |
| WO | WO 98/40645 | 9/1998 |

OTHER PUBLICATIONS

English language Abstract, Translated Description and Claims of EP 0 544 027 A1, European Patent Office's esp@cenet.com database, 4pp, Apr. 30, 2010.

Notification of Transmittal of Translation of the International Preliminary Report on Patentability received Apr. 26, 2010, 1p.

International Preliminary Report on Patentability received Apr. 26, 2010, 1 p.

Translation of Written Opinion received Apr. 26, 2010, 4pp.

* cited by examiner

DEVICE FOR GUIDING LINES, HOSES, OR THE LIKE

FIELD AND BACKGROUND OF THE INVENTION

The object of the invention refers to a line guiding device for guiding cables, hoses, lines or the like between a locally fixed and a moveable connection.

Various embodiments of a line guiding device are known for guiding cables, hoses, lines or the like between a locally fixed and a moveable connection point. Hereby we are dealing with, for example, a line guiding device which is formed by individual members joined together by linking. Such a line guiding device is also called an energy guide chain or abbreviated just as energy chain. The individual members are formed by brackets which are arranged at a distance from one another. The brackets are joined together by transverse bridges so that the members form a channel in which lines, hoses, cables or the like can be laid. The width of the transverse bridges can be very different. Energy chains are also known which are designed with a half the bridges. In these energy chains not all members have a transverse bridge.

DD 265 449 A1 describes a line guiding device which is formed by the fact that a track of substantially rectangular cross-section is extruded and then worked on, specifically slits are made in it. By the slitting the track will be divided into individual segments that are joined together with links. A comparable system is known from EP-A1-0 544 027.

U.S. Pat. No. 3,473,769 proposes forming a line guiding device by extruding a flat structure which then can be formed by stamping of individual parts and folding the side bridges to a guide system for lines, cables or hoses or the like.

A foldable protective element made of plastic is known from WO-A1-98/40645. This protective element is injection-molded or cast substantially into a flat configuration and is formed from segments joined together by bendable bridges. Hereby the protective element is a bottom segment with a bottom side and top side and at least one wall segment, which can be formed by bending and/or folding in the direction of the top side of the bottom segment and mechanical closing of a closing mechanism to form a closed channel section. The protective element, however, is either joined to other similar protective elements or is formed so that it can be joined to other similar protective elements so that the channel sections form a channel in the longitudinal direction for lines.

Line guiding devices can be made from plastic and/or metal.

SUMMARY OF THE INVENTION

Based on this, the goal of the present invention is to provide a line guiding device that can be manufactured cost-effectively.

The line guiding device according to the invention for the guiding of cables, lines, hoses or the like between a locally fixed and a moveable connection point is characterized by the fact that the line guiding device has at least one support unit made substantially in the shape of a band. Retaining elements are formed in one piece with the support unit and these elements at least partially delineate an imaginary channel in which cables, lines, hoses or the like can be laid. The retaining elements are made from the support unit by forming and are substantially perpendicular to the support unit.

The embodiment of the line guiding device according to the invention provides the possibility of producing line guiding devices cost effectively. Such line guiding devices are of advantage especially in areas of application in which mechanical stress on the line guiding device is relatively low. The preferred areas of application of the line guiding device according to the invention are automobile construction, the electrical industry and the furniture industry. The line guiding device according to the invention is especially suitable for guiding cables, lines, hoses and the like to seats, sliding doors, and/or sliding roofs of vehicles. Especially premanufactured units, which already have the line guiding device with already arranged cables, lines or hoses have the advantage that the mounting expenditure, for example in the mounting of a motor vehicle seat, is simplified. Moreover, an ordered and defined movement of the support unit can be achieved.

The retaining elements are cut or stamped from the support unit. The support unit may be manufactured from different materials, especially from plastics, fiber-reinforced plastics or from renewable raw materials, for example cellulose. For example, the support unit can be made of pulp which is preferably coated. By the coating, a hydrophobic layer is applied onto the pulp so that moisture has no significant influence on the support unit. Moreover, recycling of the support unit is simplified. The manufacture of the retaining elements is performed in a continuous or discontinuous process. For this purpose, appropriate cutting tools or stamping tools can be provided.

Especially preferred is an embodiment of the line guiding device according to the invention in which at least one retaining element is formed in a substantially frame-like shape. Hereby the retaining element can have a substantially rectangular or polygonal cross-section. However, the possibility also exists that the retaining element has a circular or oval cross-section.

In order to facilitate the introduction of cables, lines or hoses into at least one retaining element, it is proposed that the retaining element have at least one opening. The opening is preferably formed in an area in which the cables, lines or hoses exert relatively small forces onto the retaining element during the operation of the line guiding device.

According to an even further advantageous embodiment of the line guiding device according to the invention, it is proposed that at least one retaining element has two retainer sectors. The retainer sectors may hold different groups of cables, lines or hoses, so that a clear assignment of the cables, lines or hoses to retainer sectors is made possible. The replacement of cables, lines or hoses is facilitated hereby. Also the mounting of the line guiding device is facilitated, since a clear assignment of groups of cables, lines to the individual retainer sectors is made possible.

According to a still further advantageous embodiment of the line guiding device according to the invention, it is proposed that at least between two neighboring retaining elements at least one recess is formed in the supporting strap. Hereby the ability of the supporting strap to undergo torsion is changed advantageously so that the line guiding device can be also guided or moved on three-dimensional tracks.

According to a still further advantageous embodiment of the line guiding device according to the invention, it is proposed that the support unit have a top side and bottom side where at least one retaining element projects from the top side and at least one retaining element projects from the bottom side. As a result of this, the possibility is created to lay cables, line or hoses on both sides of the support unit, as a result of which the area of application of the line guiding device according to the invention is broadened.

The supporting strap and/or the retaining elements can be extruded. However, the possibility also exists of injection molding the supporting strap and/or the retaining elements.

The supporting strap according to the invention may also have appropriate connecting means through which this can be connected to fixed connection or a moveable connection.

Other advantages and details of the line guiding device according to the invention will be explained with the aid of the practical examples shown in the drawing, without the object of the invention being limited to the concrete practical examples. The following are shown:

DETAILED DESCRIPTION OF THE PREFERRED EMBODIMENTS

Figure 1:
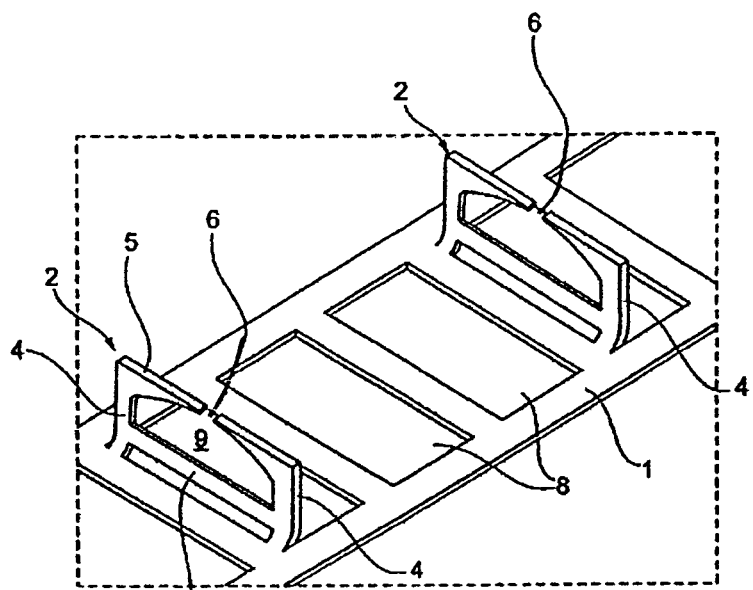
FIG. 1 shows a first practical example of a line guiding device in a perspective view.
Figure 2:
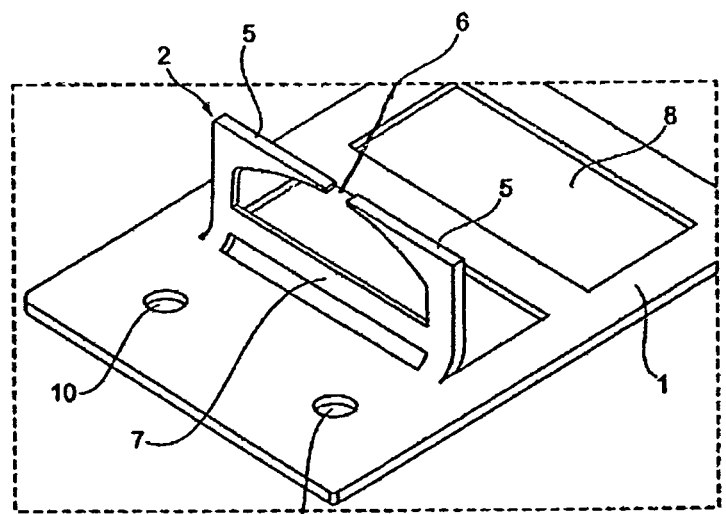
FIG. 2 shows an end region of the line guiding device according to FIG. 1 in a perspective view.

FIGS. 1 and 2 show a first practical example of a line guiding device for the guiding of cables, lines, hoses or the like between a locally fixed and a moveable connection point. The line guiding device has a support unit 1 formed substantially in a band shape. One-piece retaining elements 2 are formed with the support unit 1. The retaining elements 2 are formed from the support unit 1 and are positioned substantially transversely to the support unit 1, projecting from it. In the practical example shown, the retaining elements 2 are formed substantially three-dimensionally. Each has two sections 4 formed substantially perpendicularly to the plane of the support unit 1. In the practical example shown, the sections 4 are joined to narrowing sections 5 that end at a distance from one another. As a result of this an opening 6 is formed in each case. The sections 4 are joined together by a bridge 7 so that a greater strength of the retaining elements 2 is achieved.

Preferably the retaining elements 2 are produced by stamping from the band-shaped material of the support unit 1 and by appropriate bending.

It can be seen from the representation according to FIG. 1 that recesses 8 are provided between two neighboring retaining elements 2. These recesses 8 improve the ability of the line guiding device to have torsion applied to it.

The sections 4, 5 as well as the bridge 7 each delineate a retainer 9 whereby the retainers 9 of the retaining elements 2 form a channel in which lines, hoses, cables or the like can be arranged.

Figure 3:
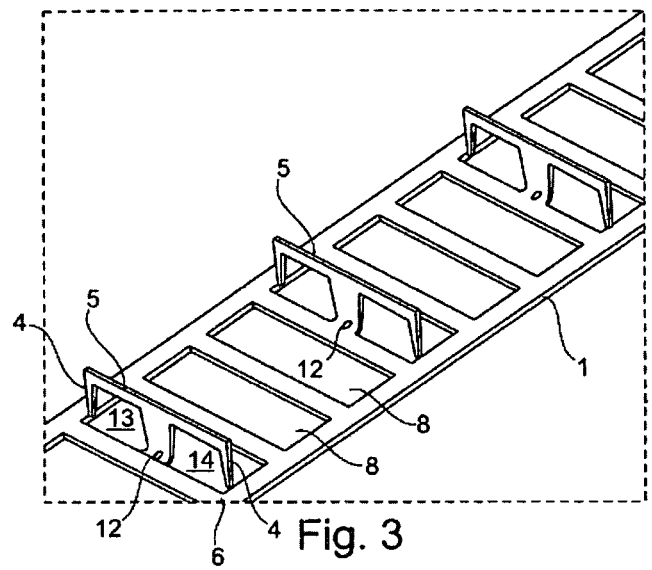
FIG. 3 shows a second practical example of a line guiding device in a perspective view.
Figure 4:
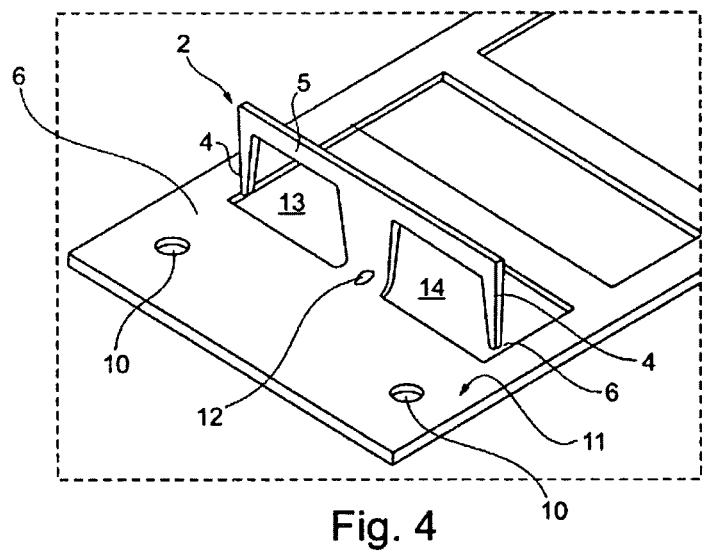
FIG. 4 shows, enlarged, an end region of the line guiding devices according to FIG. 3.

In order to fix the support unit at the fixed or moveable connection, the support unit has suitable connectors for fixing at the corresponding ends. In the practical example shown, the end region, as can be seen from FIG. 2, has through holes 10, which can be attached with corresponding connectors at the locally fixed connection or moveable connection. FIGS. 3 and 4 show a second practical example of a line guiding device for the guiding of cables, lines, hoses or the like according to the invention between a locally fixed and a moveable connection point. The line guiding device comprises a support unit 1 which is formed essentially in a band shape. Retaining elements are formed in one piece with the support unit 1. In the practical example shown, the retaining elements have two sections 4 which end a distance from the top side 11 of the support unit 1 so that openings 6 are provided. A bridge 12 is provided centrally which is connected to a section 5 of the retaining element 2. The bridge 12 is also connected to the support unit 1. The bridge 12 divides the retaining space of the retaining elements 2 into two neighboring retainer sections 13, 14, as this can be seen especially in FIG. 4.

Several retaining elements 2 are provided at a distance to one another. Recesses 8 are formed between the retaining elements 2, as a result of which the flexibility of the support unit is increased.

Figure 5:
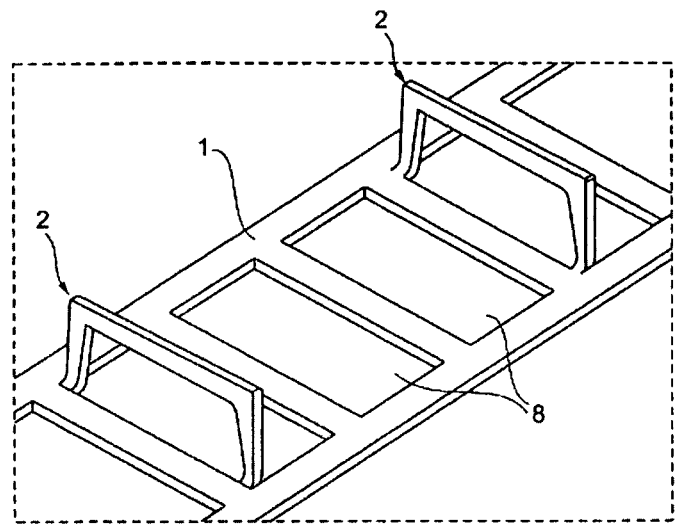
FIG. 5 shows a third practical example of a line guiding device in a perspective view.
Figure 6:
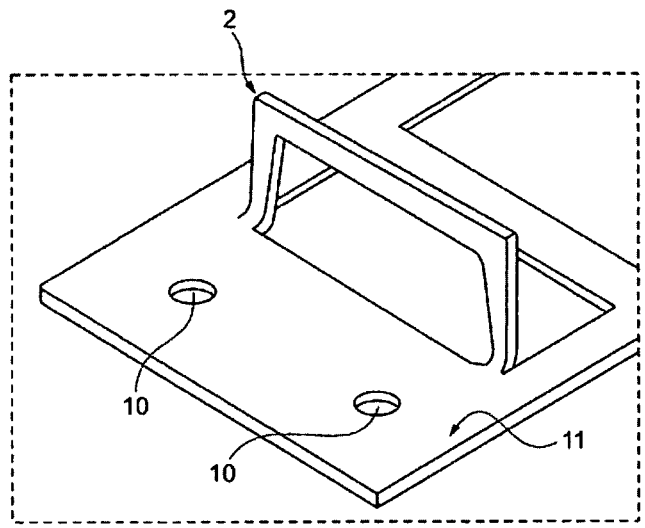
FIG. 6 shows an end region of the line guiding device according to FIG. 5.
Figure 7:
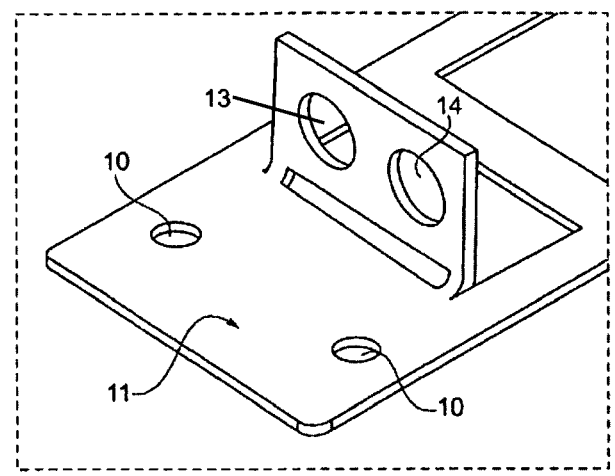
FIG. 7 shows an end region of a fourth practical example of a line guiding device in a perspective view.
Figure 8:
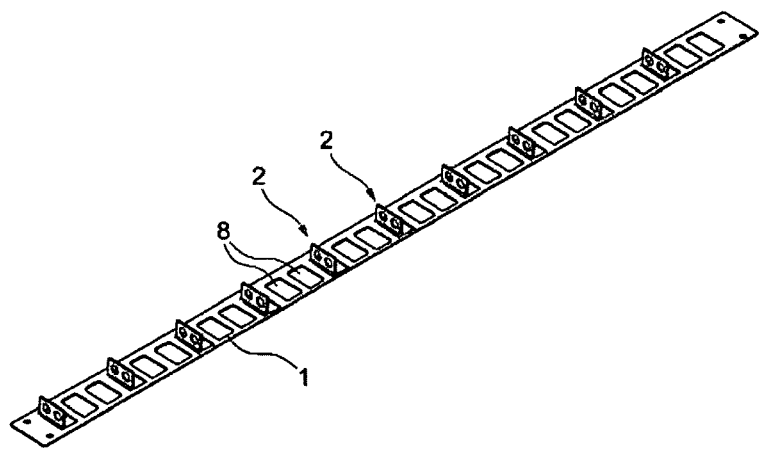
FIG. 8 shows a fourth practical example of the line guiding device in a perspective view.
Figure 9:
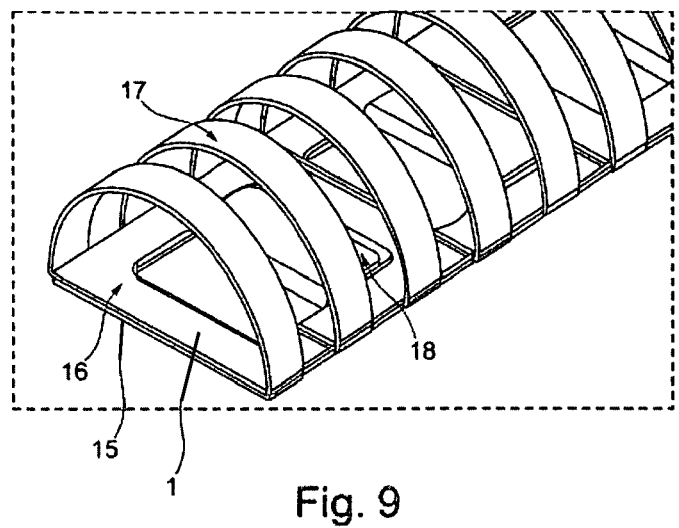
FIG. 9 shows a perspective view of a fifth practical example of a line guiding device.

FIGS. 5 and 6 show a third practical example of a line guiding device according to the invention. The line guiding device has a support unit 1 formed in the shape of a band. Recesses 8 are provided within the support unit 1. For guiding cables, lines, hoses or the like, the line guiding device has retaining elements 2 which are made in one piece with the support unit 1. The retaining elements 2 are produced from the band-shaped material of the support unit 1, for example, by stamping and bending. In the practical example shown in FIGS. 5 and 6, the retaining elements 2 are formed in a substantially frame-like shape. A still further practical example of a line guiding device according to the invention is shown in FIGS. 7 and 8. The fundamental structure of the line guiding device shown in FIGS. 7 and 8 corresponds to the structure of the line guiding device shown in FIGS. 5 and 6. The difference between the two embodiments consists in the fact that in the practical example according to FIGS. 7 and 8, the retaining elements have two retainer sectors 13, 14 which, in the practical example shown, have a substantially circular cross-section, so that individual lines can be guided. The possibility also exists that individual bundles be guided in the retainer sectors 13, 14. The cross-section of the retainer sectors 13, 14 can be different. FIG. 9 shows a still further practical example of a line guiding device. The line guiding device has a support unit 1 which is formed from two overlapping tracks 15, 16. Retaining elements 17 are formed from the support unit and these project from it substantially transversely to the support unit 1. The tracks 15, 16 are connected together with brackets 18.

Figure 10:
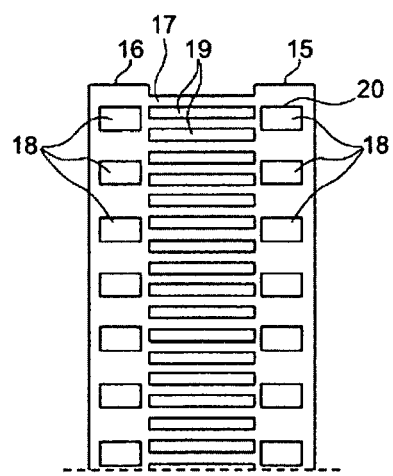
FIG. 10 shows the layout of the line guiding device according to FIG. 9.

FIG. 10 show a blank for the line guiding device shown in FIG. 9. The tracks 15, 16 are connected by retaining elements 17. Window-like openings 19 are formed between the retaining elements 17. Stampings are provided in track 15 and in track 16 which form the brackets 18. The brackets are bent upward around the edge 20 when the tracks 15, 16 lie on top of one another, overlapping.

Figure 11:
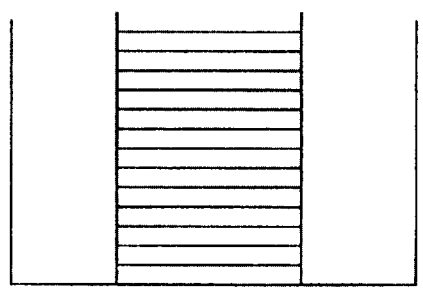
FIG. 11 shows a layout of a modified line guiding device according to FIG. 9, FIGS. 12 and 13 show additional embodiments of the line guiding device.

FIG. 11 shows a blank in which no brackets are provided.

Figure 12:
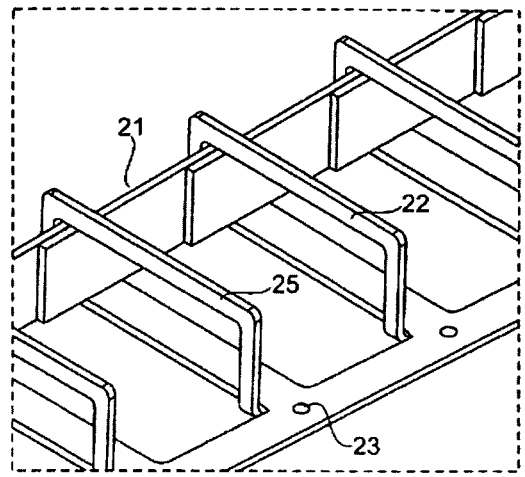

FIG. 12 shows a perspective view of a still further embodiment of the line guiding device. The line guiding device has a substantially band-shaped formed support unit 1. Retaining elements 22, 25 can be seen from the support unit 1. It can be seen from the representation according to FIG. 12 that segments are provided through which the retaining elements 22, 25 can be kept in the high flipped up position. The segments 21 can be provided in sections.

Figure 13:
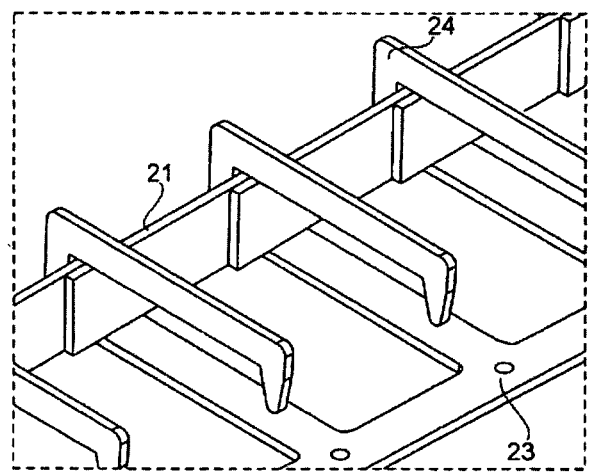

FIG. 13 shows a variation of the practical example according to FIG. 12. The retaining elements according to FIG. 13 are formed substantially in an elbow shape. They have an opening.

Figure 14:
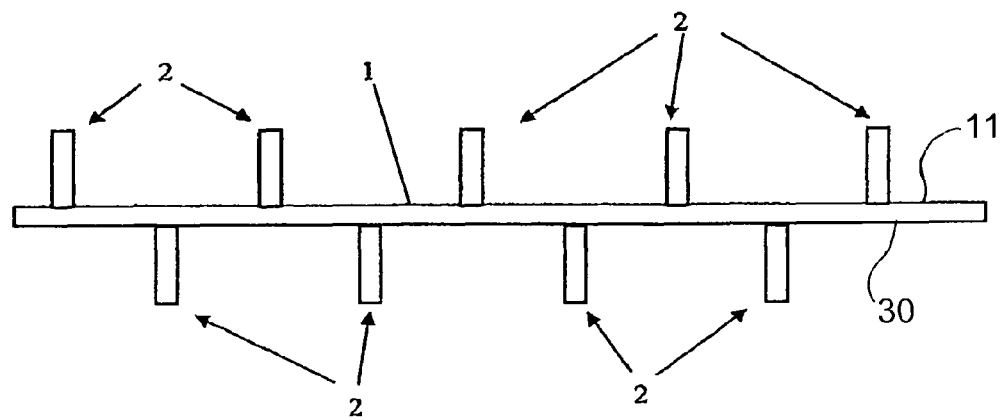
FIG. 14 is a cross sectional view of a support unit in accordance with the present invention.

According to a still further advantageous embodiment illustrated in FIG. 14 of the line guiding device according to the invention, it is proposed that the support unit 1 have a top side 11 and bottom side 30 where at least one retaining element 2 projects from the top side 11 and at least one retaining element 2 projects from the bottom side 30. As a result of this, the possibility is created to lay cables, line or hoses on both sides of the support unit 1, as a result of which the area of application of the line guiding device according to the invention is broadened.

The invention claimed is:

1. A line guiding device for guiding cables, lines, or hoses between a fixed connection point and a moveable connection point, the line guiding device comprises:
   an essentially band-shaped support unit having a fixed end, a movable end, a longitudinal axis extending between the fixed end and the movable end, and a transverse width; and
   a plurality of retaining elements, and each retaining element is formed integrally from a portion of the support unit that is bent outwardly along a transverse axis to the longitudinal axis of the support unit, and the retaining elements have a transverse width that is less than the transverse width of the support unit.

2. The line guiding device according to claim 1, wherein at least one retaining element defines a line guiding frame.

3. The line guiding device according to claim 1, wherein at least one retaining element defines an opening.

4. The line guiding device according to claim 1, wherein at least one retaining element includes a plurality of retainer sectors.

5. The line guiding device according to claim 1, wherein at least one recess is defined by the support unit between two spaced apart retaining elements.

6. The line guiding device according to claim 1, wherein the support unit has a top side and a bottom side; and at least one retaining element projects from the top side and at least one retaining element projects from the bottom side.

\* \* \* \* \*